No. 628,060.  
H. ZORN.  
DEVICE FOR SECURING MECHANICAL ELEMENTS.  
(Application filed Mar. 27, 1899.)  
(No Model.)
Patented July 4, 1899.
Fig. 1.
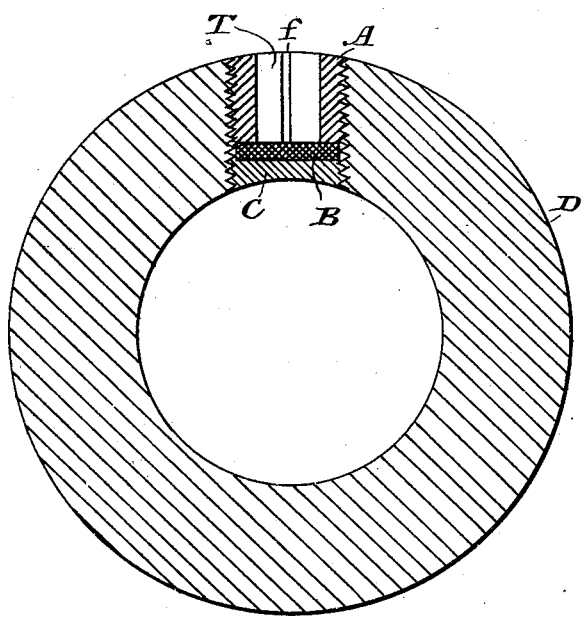
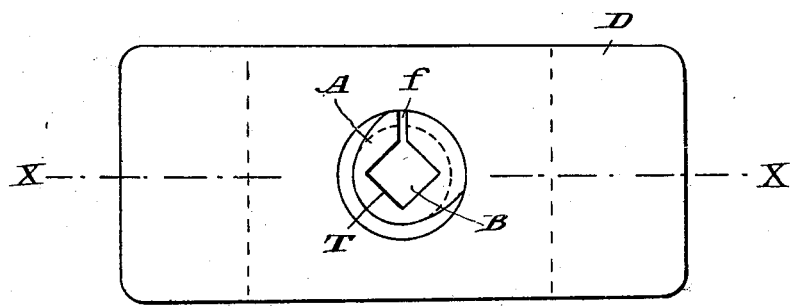
Fig. 2.
WITNESSES:
INVENTOR  
Henri Zorn  
BY  
Richards  
ATTORNEYS

UNITED STATES PATENT OFFICE.

HENRI ZORN, OF LE LOCLE, SWITZERLAND.

DEVICE FOR SECURING MECHANICAL ELEMENTS.

SPECIFICATION forming part of Letters Patent No. 628,060, dated July 4, 1899.

Application filed March 27, 1899. Serial No. 710,696. (No model.)

*To all whom it may concern:*

Be it known that I, HENRI ZORN, a citizen of the Republic of Switzerland, and a resident of Le Locle, canton of Neufchâtel, Switzerland, have invented certain new and useful Improvements in Devices for Securing Mechanical Elements Together, of which the following is a specification.

The object of the invention is to provide a device by means of which mechanical elements—such, for example, as wheels and their shafts—may be easily and quickly fastened to and unfastened from each other.

The invention is illustrated in the accompanying drawings as applied to a ring designed to be secured to a shaft.

In the drawings, Figure 1 is a section on line $x$ $x$ of Fig. 2, and Fig. 2 is a plan view of the ring.

In the figures, D represents the ring or element to be secured, which is provided with a cylindrical threaded opening through its wall. In this opening is secured a screw-sleeve A, which is split, as indicated at $f$, and is provided with a square opening T for the introduction of a tightening-key. Below the lower end of the screw is placed a washer B of steel or other hard metal and below this a washer C of soft metal, such as lead. It will thus be seen that when the screw is screwed down the soft-metal washer will conform to the shape of the shaft or other element to which the ring or the like is to be secured, and at the same time will fill the threads of the opening, as shown in Fig. 1.

Having thus described my invention and the manner it is to be used, what I now claim is—

A device for securing mechanical elements together comprising a split screw engaging a threaded recess in one of said elements and having a central opening, a soft-metal washer located at the bottom of said recess and adapted to be forced into engagement with the other element, and a hard-metal washer located between said soft-metal washer and the end of the screw, substantially as described.

In witness whereof I have hereunto set my hand in presence of two witnesses.

HENRI ZORN.

Witnesses:
ARMAND TERRELET,
JULES CHAPNY.